United States Patent [19]

Taniguchi et al.

[11] Patent Number: 5,063,183

[45] Date of Patent: Nov. 5, 1991

[54] SINTERABLE ALUMINUM NITRIDE COMPOSITION, SINTERED BODY FROM THIS COMPOSITION AND PROCESS FOR PRODUCING THE SINTERED BODY

[75] Inventors: Hitofumi Taniguchi, Chigasaki; Nobuyuki Kuramoto, Sagamihara, both of Japan

[73] Assignee: Tokuyama Soda Kabushiki Kaisha, Yamaguchi, Japan

[21] Appl. No.: 569,369

[22] Filed: Aug. 14, 1990

Related U.S. Application Data

[63] Continuation of Ser. No. 894,256, Aug. 7, 1986, abandoned.

[30] Foreign Application Priority Data

Aug. 13, 1985 [JP] Japan .................. 60-176865
Oct. 30, 1985 [JP] Japan .................. 60-241348
Nov. 8, 1985 [JP] Japan .................. 60-248797
Nov. 8, 1985 [JP] Japan .................. 60-248798

[51] Int. Cl.$^5$ ............................. C04B 35/58
[52] U.S. Cl. ......................... 501/96; 501/98
[58] Field of Search ............ 501/96, 98, 152; 264/65

[56] References Cited

U.S. PATENT DOCUMENTS

| 4,435,513 | 3/1984 | Komeya et al. ............ 502/96 |
| 4,519,966 | 5/1985 | Aldinger et al. .......... 264/56 |
| 4,540,673 | 9/1985 | Takeda et al. ............ 501/96 |
| 4,578,365 | 3/1986 | Huseky et al. ............ 501/98 |
| 4,615,863 | 10/1986 | Inoue et al. ............. 419/23 |
| 4,618,592 | 10/1986 | Kuramoto et al. .......... 501/96 |
| 4,627,815 | 12/1986 | Aldinger et al. .......... 432/24 |
| 4,659,611 | 4/1987 | Iwase et al. ............. 428/209 |
| 4,698,320 | 10/1987 | Kasori et al. ............ 501/96 |
| 4,746,637 | 5/1988 | Kasori et al. ............ 501/98 |

FOREIGN PATENT DOCUMENTS

| 147101 | 7/1985 | European Pat. Off. . |
| 7218655 | of 0000 | Japan . |
| 59-49510 | 11/1984 | Japan . |
| 60-71575 | 4/1985 | Japan ............ 501/98 |
| 60-77176 | 5/1985 | Japan ............ 501/98 |
| 60-255677 | 12/1985 | Japan ............ 501/98 |
| 61-21977 | 1/1986 | Japan ............ 501/98 |
| 166073 | 1/1986 | Japan ............ 501/96 |
| 61-146765 | 7/1986 | Japan ............ 501/98 |
| 61-146766 | 7/1986 | Japan ............ 501/98 |
| 571497 | 9/1977 | U.S.S.R. ......... 501/97 |

OTHER PUBLICATIONS

Shinozaki et al., "Effects of Various Addivitives on Sintering AlN", pp. 1-6.
Shimaki et al., "Effects of Alkaline Earth Fluorides on Sintering & Thermal Conductivity" pp. 1-15.

Primary Examiner—Mark L. Bell
Attorney, Agent, or Firm—Wenderoth, Lind & Ponack

[57] ABSTRACT

A process for producing a sintered body of aluminum nitride, which comprises
(1) forming a raw molded article from a homogeneous mixture of
 (A) a fine powder of aluminun nitride, and
 (B) a sintering aid composed substantially of (a) at least one halogen compound of at least one metal selected from the group consisting of alkaline earth metals, lanthanum group metals and yttrium, and (b) at least one halogen-free compound of at least one metal selected from the group consisting of alkaline earth metals, lanthanum group metals and yttrium; and
(2) sintering the raw molded article at a temperature of 1600° to 2100° C. in a non-oxidizing atmosphere. A sintered body having a high thermal conductivity and a high density of at least 3.2 g/cm$^3$ is prepared by the process.

10 Claims, No Drawings

SINTERABLE ALUMINUM NITRIDE COMPOSITION, SINTERED BODY FROM THIS COMPOSITION AND PROCESS FOR PRODUCING THE SINTERED BODY

This application is a continuation of now abandoned application, Ser. No. 06/894,256 filed on Aug. 7, 1986 now abandoned.

This invention relates to a sinterable aluminum nitride composition, a sintered body from this composition, and to a process for producing the sintered body. More specifically, this invention relates to an aluminum nitride sintered body having high purity, high density and high thermal conductivity, a raw batch therefor, and a process for production thereof.

Since aluminum nitride inherently has good electrical insulation, high thermal conductivity and a low coefficient of thermal expansion and is not wetted with a metal bath, attempts have been made to sinter it and use the sintered body as an electrical insulating material, an electronic material, particularly a heat radiating substrate such as a printed circuit base board or a semiconductor base board, and a crucible.

Aluminum nitride, however, is difficult to sinter singly because when heated, it generally does not form a liquid phase and has a tendency to decompose at temperatures higher than 2200° C. If it is forcibly sintered under pressure, the resulting sintered body has a low density, a low thermal conductivity much below its theoretical value, and low strength. It was proposed therefore to produce a sintered body of aluminum nitride by preparing a composition from aluminum nitride and various sintering aids, molding the composition, and calcining the molded product under atmospheric or elevated pressure.

When aluminum nitrides contains oxygen atoms, it can be formed into a sintered body of relatively high strength by the aid of various sintering aids, but since oxygen coexists, the sintered body has decreased thermal conductivity. At high temperatures, aluminum nitride is liable to take up oxygen and form a solution with oxygen. In order to obtain an aluminum sintered body having satisfactory properties, it is necessary to control the amount of oxygen (oxide) inevitably included during the production of aluminum nitride as a raw material and the amount of oxygen subsequently dissolved in the aluminum nitride by oxidation. For this purpose, there have been proposed various sintering aids which have the function of reducing the amount of oxygen-containing impurities (oxygen, alumina, etc.) in the starting aluminum nitride powder, or of trapping the oxygen-containing impurities so as to avoid dispersion of oxygen within, and/or on the surface of, the aluminum nitride particles.

Japanese Patent Publication No. 18655/1972 discloses a process for producing a composite sintered body, which comprises molding a powdery mixture of aluminum nitride and yttrium oxide under pressure, and sintering the molded mixture at 1500° to 2200° C. in nitrogen or another inert gas, and also describes that the addition of beryllium oxide gives a composite sintered body having excellent thermal conductivity and the addition of silicides, carbides, borides and nitrides (excepting nitrides of B, Al and Be) of various metals leads to composite sintered bodies having excellent electrical conductivity.

Japanese Laid-Open Patent Publication No. 127267/1985 discloses a sintered body of aluminum nitride having high thermal conductivity comprising a major proportion of aluminum nitride, 0.01 to 15% by weight of a rare earth element or a material containing it calculated as the rare earth element, and 0.01 to 20% by weight of oxygen. It is noteworthy that this patent document states that the inclusion of oxygen is necessary in order to increase the sinterability of AlN material; that too much oxygen, however, has a deleterious effect on high thermal conductivity; and that the rare earth element contributes to such increased sinterability of AlN and traps oxygen because the rare earth forms a garnet structure and is present in the AlN grain boundary.

Japanese Patent Publication No. 49510/1983 describes a process for producing a sintered body of aluminum nitride which comprises adding 0.1 to 10% by weight of at least one oxide of calcium, barium and strontium, and sintering the mixture at 1600° to 2000° C. in a non-oxidizing atmosphere.

Japanese Laid-Open Patent Publication No. 55377/1983 discloses a process for producing a sintered body of aluminum nitride, which comprises molding a powdery mixture comprising (a) aluminum nitride powder, (b) a powder of at least one compound selected from calcium oxide, gallium oxide, strontium oxide and compounds capable of being converted to such oxides by calcination, and (c) carbon powder or a powder of a substance capable of being converted to carbon by calcination, and sintering the molded mixture. This patent document states that the component (c) inhibits the formation of spinel which impairs the thermal conductivity of the sintered body.

Summary of Speeches in the 23rd Meeting for Basic Discussion of Ceramics, January 1985 carries at page 20 a paper entitled "Effects of Alkaline Earth Metal Fluorides on the Sintering and Thermal Conductivity of AlN". This paper discloses that when 1 to 15% by weight of $CaF_2$ was added to a pulverized aluminum nitride powder containing 2.9% by weight of oxygen as an impurity and the mixture was sintered at 1800° C. in an atmosphere of nitrogen, a hot-press sintered body containing 10% by weight of $CaF_2$ and a maximum thermal conductivity of 98 W/m.K was obtained, and the amounts of residual Ca and F in the sintered body were less than 40% and less than 20%, respectively, based on the amounts added.

At page 19 of this Summary is given a paper entitled "Effects of Various Additives on Sintering of AlN". In this paper, a press-molded product of a pulverized aluminum nitride powder containing 3.4% by weight of oxygen as an impurity is sintered under atmospheric pressure at 1800° C. for 2 hours in an atmosphere of nitrogen, and the relation between the density and the thermal conductivity of the sintered body was determined. It describes that when the density of the sintered body is up to 3.1 g/cm$^3$, its thermal conductivity increases linearly with increasing density, and that the sintered body obtained shows a maximum thermal conductivity of about 80 W/m.K. It is also stated that $CaF_2$, $CaCO_3$ and $Y_2O_3$ gave sintered bodies having high thermal conductivity.

A paper entitled "Effects of Rare Earth Fluorides on Sintering and Thermal Conductivity of AlN" given at page 21 of the above Summary discloses that when 0 to 15% by weight of $YF_3$ was added to pulverized AlN containing 2.9% by weight of oxygen and the mixture was sintered at 1800° C. in a nitrogen gas atmopshere, a hot-pressed sintered body containing 10% by weight of YF$_3$ had a maximum thermal conductivity of about 80 W/m.K.

Summary of Speeches in the 1960 Annual Meeting of the Ceramic Industry Association, 1985, pages 517-518 carries a paper entitled "AlN Ceramics with High Thermal Conductivity, 3. Effects of Additives on Thermal Conductivity". This paper describes that when 7% by weight of Y$_2$O$_3$ and 3% by weight of YF$_3$ were added respectively to AlN powder (oxygen content 0.97 wt. %) produced from gamma-Al$_2$O$_3$ by a carbon reducing method and the mixture was sintered under atmospheric pressure, sintered bodies having a maximum thermal conductivity of 170 W/m.K and 180 W/m.K, respectively, were obtained.

Japanese Laid-Open Patent Publication No. 96578/1985 discloses a temperature equilibrium material composed of a ceramic material of densely sintered aluminum nitride having a thermal conductivity of at least 100 W/m.K. This patent document describes in its working example that a ceramic material having a flexural strength of 320 N/mm$^2$, a thermal conductivity of 200 W/m.K and a density of 3.27 g/cm$^3$ was obtained by ball-milling a mixture of 99% by weight of an aluminum nitride powder containing 1% by weight of aluminum metal powder having a particle diameter of less than 1 micrometer and 1% by weight of yttrium oxide powder for 40 hours in an argon atmosphere, subjecting the resulting powder to a sieve of 100 micrometers, compression-molding the powder, and sintering the molded product at a temperature of up to 1850° C.

It is an object of this invention to provide an aluminum nitride sintered body having a density of as high as at least 3.2 g/cm$^3$ which is very near to the theoretical value of 3.26 g/cm$^3$ and a high thermal conductivity of, for example, at least 200 W/m.K measured at room temperature on a body having a thickness of 6 mm.

It is another object of this invention to provide an aluminum nitride sintered body having light translucency, high electrical insulation and a low coefficient of thermal expansion.

Still another object of this invention is to provide an aluminum nitride sintered body having a high purity.

Yet another object of this invention is to provide an aluminum nitride composition which can be sintered even at a temperature 200° C. lower than the previously known sintering temperatures for aluminum nitride.

A further object of this invention is to provide a process for producing the aluminum nitride sintered body using the sinterable aluminum nitride composition of this invention.

Additional objects of this invention along with its advantages will become apparent from the following description.

According to this invention, the above objects and advantages of this invention are achieved by a sintered body of aluminum nitride, said sintered body having a high thermal conductivity and a high density of at least 3.2 g/cm$^3$ and comprising at least 94% by weight of aluminum nitride, at most 0.5% by weight of bound oxygen, at most 1% by weight as metal of an oxide of at least one metal element selected from the group consisting of alkaline earth metals, lanthanum group metals and yttrium and at most 0.1% by weight as metal of metal compounds as impurities, wherein the metal of the metal compounds is silicon, iron, chromium, nickel, cobalt, copper or titanium.

According to this invention, there is provided as a raw batch suitable for giving the sintered body of this invention, a sinterable aluminum nitride composition comprising a homogeneous mixture of (A) a fine powder of aluminum nitride, and (B) a sintering aid composed substantially of (a) at least one halogen compound of at least one metal selected from the group consisting of alkaline earth metals, lanthanum group metals and yttrium, and (b) at least one halogen-free compound of at least one metal selected from the group consisting of alkaline earth metals, lanthanum group metals and yttrium.

As a technique suitable for the production of the sintered body of this invention using the above composition, the present invention provides a process for producing a sintered body of aluminum nitride, which comprises (1) forming a raw molded article from a homogeneous mixture of (A) a fine powder of aluminum nitride, and (B) a sintering aid composed substantially of (a) at least one halogen compound of at least one metal selected from the group consisting of alkaline earth metals, lanthanum group metals and yttrium, and (b) at least one halogen-free compound of at least one metal selected from the group consisting of alkaline earth metals, lanthanum group metals and yttrium; and (2) sintering the raw molded article at a temperature of 1600° to 2100° C. in a non-oxidizing atmosphere.

The present invention pertains to a technique of obtaining a sintered body of aluminum nitride as stated above, and its greatest characteristic feature is that a novel sintering aid is used and the use of this sintering aid enables sintering at a temperature lower than in the case of using conventional known aluminum nitride sintering aids by, for example, 200° C. Lowered sintering temperatures have the advantage that since alumina contained as an impurity in aluminum nitride can be trapped at low temperatures, the diffusion of oxygen into the aluminum nitride particles is reduced, and consequently, the oxygen content of the resulting sintered body can be decreased. Furthermore, since a part, or a substantial portion, of the sintering aid volatilizes from the sintered body during firing, the purity of aluminum nitride in the resulting aluminum nitride sintered body can be increased remarkably.

For the foregoing reason, the sintered body obtained by this invention has a high density of at least 3.2 g/cm$^3$, a high strength and a high thermal conductivity of at least 200 W/m.K measured at room temperature on a body having a thickness of 6 mm and is translucent without a degradation in the inherent properties of aluminum nitride.

The sintering aid used in the sinterable aluminum nitride composition and in the process of producing the sintered body in accordance with this invention is novel in that it is composed of a particular halogen compound and a particular halogen-free compound. The halogen compound is a halogen compound of at least one metal selected from the group consisting of alkaline earth metals, lanthanum group metals and yttrium. At least one such halogen compound can be used.

Examples of preferred alkalina earth metals are beryllium (Be), magnesium (Mg), calcium (Ca), strontium (Sr) and barium (Ba). Examples of preferred lanthanum group metals include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytteribium (Yb), and lutetium (Lu).

The above halogen compounds are halogen compounds of these alkaline earth metals, lanthanum group metals and yttrium. The halogens constituting these halogen compounds are, for example, fluorine, chlorine, bromine and iodine. Fluorine and bromine are preferred, and fluorine is especially preferred. Each halogen compound may contain one more of halogen atoms. Halides are especially suitably used as the halogen compound.

From the industrial viewpoint, fluorides and bromides of Y, La, Ce, Pr, Nd, Sm, Eu, Gd, Dy, Ca, Sr and Ba are preferred as the halogen compound.

Specific examples of the halogen compounds are yttrium fluoride, lanthanum fluoride, cerium fluoride, praseodymium fluoride, neodymium fluoride, samarium fluoride, europium fluoride, gadolinium fluoride, dysprosium fluoride, yttrium bromide, lanthanum bromide, cerium bromide, praseodymium bromide, neodymium bromide, samarium bromide, europium bromide, gadolinium bromide, dysprosium bromide, yttrium iodide, lanthanum iodide, cerium iodide, praseodymium iodide, calcium fluoride, strontium fluoride, barium fluoride, calcium bromide, strontium bromide, and barium bromide.

The halogen-free compound is a halogen-free compound of a metal selected from the group consisting of alkaline earth metals, lanthanum group metals and yttrium. At least one such halogen-free compound may be used.

Examples of the alkaline earth metals and lanthanum group metals are the same as shown above for the halogen compound (a).

The halogen-free compound denotes a compound which does not contain a halogen atom as a constituent element. However, compounds containing a halogen atom together with an oxygen atom, such as chloric acid salts, are classified as the halogen-free compound in this invention in view of the function of the sintering aid.

Examples of preferred halogen-free compounds include oxides, nitrates, nitrites, carbonates, bicarbonates, sulfates, sulfites, chlorates, oxalates, acetates and aluminates of the aforesaid metals.

These halogen-free compounds can form oxides during calcination.

Industrially, oxides, carbonates, nitrates, oxalates and aluminates of Y, La, Ce, Pr, Nd, Sm, Eu, Gd, Dy, Ca, Sr and Ba are preferred as the halogen-free compound.

Especially preferred aluminates are those represented by the following formula

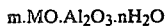

wherein M is an alkaline earth metal, m is a number of at least 0.3, and n is 0 or a positive number.

Salts of calcium, strontium and barium are especially preferred for industrial practice because they greatly increase the thermal conductivity of the resulting aluminum nitride sintered body. Larger m values lead to greater effects of the sintering aid and to increased purities of the resulting aluminum nitride sintered bodies. In the present invention, m is preferably at least 1. Aluminates of the above formula in which m is at least 2 are more preferred. The aluminates used in this invention may be in the form of anhydrides, or may contain water of crystallization.

Specific examples of the halogen-free compound are oxides such as yttrium oxide, lanthanum oxide, cerium oxide, praseodymium oxide, neodymium oxide, samarium oxide, europium oxide, gadolinium oxide, dysprosium oxide, calcium oxide, strontium oxide and barium oxide; inorganic acid salts such as yttrium carbonate, lanthanum carbonate, cerium carbonate, praseodymium carbonate, neodymium carbonate, samarium carbonate, europium carbonate, gadolinium carbonate, dysprosium carbonate, calcium carbonate, strontium carbonate, barium carbonate, yttrium nitrate, lanthanum, nitrate and calcium nitrate; organic acid salts such as yttrium oxalate, lanthanum oxalate, calcium oxalate, yttrium acetate, lanthanum acetate and calcium acetate; calcium aluminate or its hydrates such as $CaO.2Al_2O_3$, $CaO.Al_2O_3$, $5CaO.3Al_2O_3$, $12CaO.7Al_2O_3$ and $3CaO.Al_2O_3$; barium aluminate and its hydrate such as $3BaO.Al_2O_3$; and strontium aluminate and its hydrate such as $3SrO.Al_2O_3$ and $3SrO.Al_2O_3.6H_2O$.

The above sintering aids are used generally as particles having an average particle diameter of not more than 10 micrometers, preferably not more than 5 micrometers because they act at lower temperatures as their particle diameter become smaller.

In the composition of this invention, the halogen compound is used in an amount of 0.02 to 10% by weight, preferably 0.02 to 5% by weight, especially preferably 0.5 to 5% by weight. The halogen-free compound, on the other hand, is used in an amount of preferably 0.02 to 5% by weight, more preferably 0.5 to 5% by weight. Generally, it is preferred to use the sintering aid such that the amount of the halogen compound is larger than that of the halogen-free compound.

Generally, as the amount of the sintering aid becomes larger, the strength and/or thermal conductivity of the resulting sintered body becomes lower. In particular, when the sintering aid [as the combination of components (a) and (b)] is used in an amount exceeding 15% by weight, the amount of the sintering aid remaining as impurities in the resulting aluminum nitride sintered body greatly tends to increases to cause a marked decrease in transparency. If the amount of the sintering aid [as the combination of components (a) and (b)] is below 0.04% by weight, it is difficult to obtain a sufficient effect. As the amount of each of the sintering aid components increases from 0.02% by weight, the strength of the resulting sintered body becomes progressively higher. To obtain a sintered body having high strength, it is advantageous to use each of the sintering aid component in an amount of at least 0.5% by weight.

The properties of the final aluminum nitride sintered body can be varied more or less depending upon the combinations of the halogen compound and the halogen-free compound. For example, for the production of a sintered body of aluminum nitride having a high thermal conductivity, it is industrially advantageous to use a combination of a halogen compound of an alkaline earth metal with a halogen-free compound, particularly an oxide, of yttrium or a lanthanum group metal, or a combination of a halogen compound of yttrium or a lanthanum group metal with a halogen free compound, particularly an oxide, of an alkaline earth metal as the sintering aid. Furthermore, for increased strength or the ease of the calcination step, a combination of a halogen compound of yttrium or a lanthanum group metal with an alkaline earth metal aluminate, or a combination of a halogen compound of yttrium or a lanthanum group metal with a halogen-free compound of the same metal produces an excellent result as the sintering aid. In view of the calcining temperature and the stability of sintering, a combination of a halogen compound of an alkaline earth metal with a halogen-free compound of the same metal or an aluminate of the same metal may sometimes be preferred. From the industrial standpoint taken in view of these various factors, the rough ranking of preferred combinations of the sintering aid components is summarized in Table A below.

TABLE A

| Halogen free compound | Halogen compound | | |
|---|---|---|---|
| | Yttrium halogen compound | Lanthanum group metal halogen compound | Alkaline earth metal halogen compound |
| Yttrium halogen-free compound | 2 | 2 | 1 |
| Lanthanum group metal halogen-free compound | 2 | 2 | 1 |
| Alkaline earth metal halogen-free compound | 1 | 1 | 3 |
| Alkaline earth metal aluminate | 2 | 2 | 3 |

The aluminum nitride powder used in the starting batch composition of this invention is not particularly restricted, but has a purity of generally at least 80% by weight, preferably at least 85% by weight, particularly at least 95% by weight. Such an aluminum nitride powder is obtained, for example, by directly nitriding aluminum metal under heat and pressure in an atmosphere of nitrogen, or by mixing alumina with a reducing agent such as carbon and then heating the mixture in a nitrogen atmosphere. Generally, particularly favorable results can be obtained by using an aluminum nitride powder produced by reducing alumina with carbon. The particles of the aluminum nitride powder are preferably small and uniform in size. Usually, agglomerated particles of the aluminum nitride powder have an average particle diameter of not more than 3 micrometers, preferably 0.3 to 2 micrometers.

The sinterable aluminum nitride composition of this invention can be prepared by dry-mixing or wet-mixing the aluminum nitride powder and the halogen compound and the halogen-free compound as the sintering aid. In a particularly preferred embodiment, these materials are mixed in the wet state using a liquid dipsersing medium. The liquid dispersing medium is not particularly limited, and generally water, alcohols, hydrocarbons or mixtures of these may be conveniently used. In industrial practice, lower alcohols having not more than 4 carbon atoms, such as methanol, ethanol and butanol, are most conveniently used.

Known wet-mixing devices may be used in performing the mixing. Preferably, these devices do not comprise a material which causes inclusion of impurity components in the composition. For example, at least the inner wall of the devices should be made of, or coated with, aluminum, nitride itself or a plastic material such as polyethylene, polyurethane or nylon.

The sequence of mixing the aluminum nitride powder, the halogen compound and the halogen-free compound is not particularly restricted. For example, the three components may be mixed by one operation. Or two of the compounds may first be mixed, and the resulting mixture, may be mixed with the remaining one component. For example, it is desirable to mix a premixture of the halogen compound and the halogen-free compound with aluminum nitride powder as a main component.

The process of this invention for producing the aluminum nitride sintered body basically comprises molding a homogeneous mixture of aluminum nitride powder and the sintering aid, and calcining the raw molded article in a non-oxidizing atmosphere.

The raw molded article can be produced by molding a homogeneous mixture comprising aluminum nitride powder, the sintering aid and as required, a binder by a dry press method, a rubber press method, an extrusion method, an injection method, a doctor blade sheet forming method, etc. Examples of the binder are water, alcohols glycols, polyalkylene glycols, paraffins, polyvinyl alcohol, polyvinyl acetate, a partial saponification product of polyvinyl acetate, polyvinylpyrrolidone, polymethyl (meth)acrylate, agar, varnishes, and glue. As required, the raw molded article is heated in air or in an inert atmosphere to dry and dewax it (decomposition and removal of the binder). Drying and dewaxing are generally achieved sufficiently by heating the molded article at a temperature of 500 to 600, or below for several tens of minutes to several hours.

Calcination of the raw molded article is carried out in a non-oxidizing atmosphere, such as nitrogen gas, helium gas or argon gas. The atmosphere may be vacuum, air or a pressurized atmosphere, for example, an atmosphere of nitrogen under about 2 to 100 atmospheres. The calcination temperature is in the range of 1600° to 2100° C., preferably 1650° to 1900° C., especially preferably 1700° to 1800° C. By performing the calcination at the aforesaid calcination temperature, the oxygen content of the resulting sintered body can be lowered.

The calcination temperature is determined by measuring the temperature of the surface of a graphite crucible containing the raw molded article by means of a radiation thermometer, and compensating it so that it shows the temperature of the gas within the graphite crucible.

Investigations of the present inventors have shown that within the range of at least 1300° to 1600° C. before the calcination temperature reaches 1600° C., the average rate of temperature elevation is preferably adjusted to 1° C./min. to 40° C./min., more preferably 5° to 30° C.

The calcination conditions are preferably such that excessive evaporation of the sintering aid is inhibited during the temperature elevating step, and after sintering, remaining of the sintering aid components in the sintered body is minimized. Desirably, the aforesaid temperature elevating conditions and the calcination temperature are employed. Especially preferably, the same temperature elevating rate as above is also empoloyed with the range of at least 1200° to 1300° C. before the calcination temperature reaches 1300° C.

Temperature elevation may be effected at a constant rate until the temperature reaches the desired calcination temperature. Alternatively, this can be effected in accordance with a temperature elevation program having two or three rate gradients. Industrially, a single average rate of temperature elevation is employed throughout the entire temperature range up to the calcination temperature.

The calcination time at the desired calcination temperature varies depending upon the calcination temperature, the type and amount of the sintering aid and the average rate of temperature elevation. Usually, it is within the range of 10 minutes to 30 hours.

By employing the aforesaid calcination conditions, the amount of the sintering aid remaining in the final aluminum nitride sintered body can be decreased from the original amount before calcination. The amounts of both the halogen compound and the halogen-free compound as the sintering aid can be reduced usually to not more than ½, preferably not more than 1/5, above all not more than 1/10, as metal.

Accordingly, the sintered body of this invention contains at least 94%, preferably 97 to 99%, especially preferably more than 99%, of aluminum nitride and only at most 1%, as metal, of metal oxides derived from the sintering aid, at most 0.5% of oxygen and at most 0.1%, as metal of metal compounds as impurities.

It is also possible to reduce the proportion of the metal oxides derived from the sintering aid usually to not more than 0.5% by weight, and at times not more than 0.3% by weight, and even not more than 0.1% by weight. The oxygen content can also be reduced to not more than 0.2% by weight, or even not more than 0.1% by weight.

Since the aluminum nitride obtained by the method of this invention has low contents of the sintering aid and oxygen, it has very good thermal conductivity. Its thermal conductivity is usually at least 150 W/m.K, preferably at least 200 W/m.K. Depending upon the calcination conditions, a sintered body having a thermal conductivity of at least 220 W/m.K, above all higher than 260 W/m.K, can be obtained. Furthermore, the sintered body of aluminum nitride in accordance with this invention has excellent light translucency. The light translucency of the sintered body of this invention corresponds to a coefficient of absorption to light having a wavelength of 6 micrometers in the Lambert-Beer equation of not more than 60 cm$^{-1}$, particularly not more than 45 cm$^{-1}$.

Accordingly, the aluminum nitride sintered body of this invention is very useful industrially as a heat radiation base board, an electronic circuit base board, a heat radiation material and an insulating material of electronic devices.

The following examples illustrate the present invention more specifically. It should be understood that they in no way limit the scope of this invention.

Thermal conductivity was measured by laser flash method. A circular plate-like sintered body having a thickness of 3 mm and a diameter of 10 mm, and a circulate plate-like sintered body having a thickness of 6 mm and a diameter of 10 mm were used as samples in this test. With regard to the 3 mm-thick sample, gold was vacuum-deposited on both surfaces of the sample, and both surfaces were further subjected to blackening treatment by using a carbon spray. By measuring the heat diffusion rate of the sample, its thermal conductivity was determined. With regard to the 6 mm-thick sample, only that surface which receives laser light was blackened with a carbon spray, and its thermal conductivity was determined from its thermal diffusivity measured in the same way.

Since the 3 mm-thick sample was easier to prepare, samples of this thicknesss were mainly used in the following examples. In this case, the heat diffusion rate becomes lower than its true value because of the gold deposition treatment. But this gives rise no problem since the heat diffusion rates can be accurately compared.

Light transmittance was measured by using a sample which was machined to a thickness of 0.5 mm and both surfaces of which were mirror-surface polished. The liner transmittance of light having a wavelength of 6.0 mirometers was mesured, and a coefficient of absorption was determined in accordance with the equation of Lambert-Beer using this measured transmittance.

EXAMPLE 1

$Y_2O_3$ powder (0.7% by weight) and 1.3% by weight of $CaF_2$ powder were added to aluminum nitride powder having an average particle diameter of 1.42 micrometers, containing 97% by weight of particles having particles with an average particle diameter of not more than 3 micrometers, and having the composition shown in Table 1, and they were uniformly mixed in ethanol. The mixture was dried, and about 1.0 g of the mixture was monoaxially pressed under a pressure of 200 kg/cm$^2$ in a mold having an inside diameter of 15 mm, and then rubber-pressed under a pressure of 1500 kg/cm$^2$ to produce a raw molded article having a density of 1.60 g/cm$^3$. The raw molded article was placed in a graphite crucible coated with boron nitride powder. Temperature was raised to 1100° C. in nitrogen under 1 atmosphere over the course of 40 minutes, and then the temperature was raised from 1100° to 1800° C. at a rate of 15° C./min. The molded article was maintained at 1800° C. for 10 hours. The resulting sintered body had a density of 3.25 g/cm$^3$. The sintered body was machined to a thicknesss of 3 mm and its thermal conductivity was measured by means of an In-Sb infrared ray sensor without contact in accordance with the laser flash method. It had a thermal conductivity of 195 W/m.K. When a 6 mm-thick sample was used, it had a thermal conductivity of 251 W/m.K.

The oxygen content of this sintered body, measured by a radioactivation analysis method, of 0.09%.

The sintered body was treated by an alkali fusion method, and the contents of Ca, Y, Mg, Cr, Si, Zn, Fe, Cu, Mn, Ni, Ti and Co were measured by inductively coupled plasma emission spectral analysis. They were Ca=880 ppm, Y=300 ppm, Mg<5 ppm, Cr<10 ppm, Si=131 ppm, Zn<10 ppm, Fe<10 ppm, Cu<10 ppm, Mn<5 ppm, Ni=21 ppm, Ti=23 ppm, and Co<10 ppm as concentrations based on the sintered body. The total content of ten elements excepting Ca and Y added as the sintering aid was less than 233 ppm.

Another sintered body obtained by sintering in the same manner as bove was machined to a thickness of 0.5 mm and both surfaces of it were mirror-surface polished. When its light transmittance was measured, a linear transmittance of 38% was obtained with respect to a wavelength of 6.0 micrometers.

TABLE 1

| Analysis of aluminum nitride powder | |
|---|---|
| AlN content | 98.0% |
| Element | Content |
| Mg | <5 (ppm) |
| Cr | <10 (ppm) |
| Si | 38 (ppm) |
| Zn | <10 (ppm) |
| Fe | 15 (ppm) |
| Cu | <5 (ppm) |
| Mn | <5 (ppm) |
| Ni | <10 (ppm) |

TABLE 1-continued

| Analysis of aluminum nitride powder | |
| --- | --- |
| AlN content | 98.0% |
| Element | Content |
| Ti | < 5 (ppm) |
| Co | <5 (ppm) |
| Al | 64.8 (wt. %) |
| N | 33.5 (wt. %) |
| O | 1.0 (wt. %) |
| C | 0.05 (wt. %) |

EXAMPLE 2

$Y_2O_3$ and $CaF_2$ were mixed in various proportions with the same aluminum nitride as used in Example 1, and the mixture was sintered under atmospheric pressure by the same operation as in Example 1. The results are shown in Table 2. A sample having a thickness of 3 mm was used in the measurement of thermal conductivity. The light transmittance of the sintered body was measured as described hereinabove.

Run No. 4 is a comparative run in which $CaF_2$ was not used.

mixed uniformly in ethanol. The mixture was dried, and about 1.0 g of the dried mixture was put in a graphite die having an inside diameter of 10 mm and coated with boron nitride powder and hot-press sintered at 1800° C. under a pressure of 100 kg/cm² for 1 hour in nitrogen gas under 1 atmosphere using a high-frequency induction heating furnace. During the sintering, the mixed powder abruptly began to shrink at 1400° C. and almost finished shrinking at 1800° C. This shows that sintering began at 1400° C. The resulting sintered body had a density of 3.26 g/cm³. The sintered body had a thermal conductivity of 167 W/m.K when it was measured by using a 3 mm thick sample. The sintered body had an oxygen content of 0.27% by weight.

The sintered body was then melted in alkali, and the contents of Ca, Y, Mg, Cr, Si, Zn, Fe, Cu, Mn, Ni, Ti and Co were measured by inductively coupled plasma emission spectral analysis, and were found as followes: Ca=920 ppm, Y=430 ppm, Mg<5 ppm, Cr<10 ppm, Si=126 ppm, Zn<10 ppm, Fe=14 ppm, Cu<10 ppm, Mn<5 ppm, NI<20 ppm, Ti=27 ppm, and Co<10 ppm, as concentrations based on the sintered body. The total content of ten elements excepting Ca and Y added

TABLE 2

| | Calcination conditions | | | Amount of the sintering aid added (wt. %) | | Amounts remaining in the sintered body (ppm) | | | Oxygen content (wt. %) | Density of the sintered body g/cm³ | Thermal conductivity W/m · K | Light transmittance (%) |
| --- | --- | --- | --- | --- | --- | --- | --- | --- | --- | --- | --- | --- |
| Run No. | Temperature (°C.) | Time (hrs) | Temperature elevating rate (°C./min) | $Y_2O_3$ | $CaF_2$ | Y | Ca | (*) Other metals | | | | |
| 1 | 1800 | 4 | 15 | 1.7 | 3.3 | 1200 | 400 | below 245 | 0.12 | 3.25 | 171 (221 ***) | 25 |
| 2 | 1800 | 4 | 10 | 3.0 | 3.0 | 2950 | 650 | below 215 | 0.17 | 3.26 | 169 | 19 |
| 3 | 1800 | 4 | 25 | 3.0 | 1.5 | 3570 | 420 | below 216 | 0.19 | 3.26 | 166 | 20 |
| 4 | 1800 | 4 | 15 | 1.5 | 0 | 12620 | (**) 128 | below 301 | 0.59 | 3.27 | 105 | 4 |

(*) The total amount of Mg, Cr, Si, Zn, Fe, Cu, Mn, Ni, Ti and Co as metal
(**) Existing in the starting AlN powder
(***) Measured by using a 6 mm-thick sample

EXAMPLE 3

Various sintering aids were mixed with the same aluminum nitride powder as used in Example 1, and the mixtures were sintered under atmospheric pressure as in Example 1. A 3 mm thick sample was used for measurement of thermal conductivity of the sintered bodies. The light transmittances of the sintered bodies were also measured. The results are shown in Table 3.

as the sintering aid was less than 237 ppm.

For comparison, a sintered body was produced by the same operation as above except that 1% by weight of $Y_2O_3$ was added as the sintering aid, and $CaF_2$ was not added. During the sintering, the mixed powder began to shrink at 1600° C. and continued to shrink at 1800° C. This shows that sintering began at 1600° C. After it was maintained at 1800° C. for 2 hours, its shrinking nearly ended.

TABLE 3

| | Calcination conditions | | | Amount of the sintering aid added (wt. %) | | | | Amounts remaining in the sintered body (ppm) | | | | Oxygen content (wt. %) | Density of the sintered body (g/cm³) | Thermal conductivity (W/m · K) | Light transmittance (%) |
| --- | --- | --- | --- | --- | --- | --- | --- | --- | --- | --- | --- | --- | --- | --- | --- |
| Run No. | Temperature (°C.) | Time (hrs) | Temperature elevating rate (°C./min) | Lanthanum group metal compound | | Halogen compound of an alkaline earth metal | | Yttrium or lanthanum group metal | | Alkaline earth metal | | (*) Others | | | |
| 1 | 1800 | 4 | 15 | $La_2O_3$ | 1% | $BaF_2$ | 2% | La | 490 | Ba | 2030 | below 312 | 0.14 | 3.25 | 168 (215**) | 21 |
| 2 | 1800 | 4 | 15 | $Sm_2O_3$ | 1% | $SrF_2$ | 2% | Sm | 420 | Sr | 3540 | below 286 | 0.18 | 3.26 | 163 | 19 |
| 3 | 1800 | 4 | 15 | $CeO_2$ | 1% | $CaBr_2$ | 2% | Ce | 380 | Ca | 2310 | below 231 | 0.20 | 3.26 | 160 | 24 |
| 4 | 1800 | 4 | 15 | $La_2O_3$ | 1% | $BaI_2$ | 2% | La | 510 | Ba | 1950 | below 305 | 0.15 | 3.26 | 171 | 15 |
| 5 | 1800 | 4 | 15 | $La_2O_3$ | 1% | $CaF_2$ | 2% | La | 430 | Ca | 2100 | below 218 | 0.18 | 3.25 | 165 | 22 |

(*) The total amount of Mg, Cr, Si, Zn, Fe, Cu, Mn, Ni, Ti and Co as metal
(**) Measured by using a 6 mm-thick sample

EXAMPLE 4

$Y_2O_3$ powder (0.7% by weight) and 1.3% by weight of $CaF_2$ powder were added to the same aluminum nitride powder as used in Example 1, and they were As is clearly seen from a comparison of the above two runs, the sinterable aluminum nitride composition of this invention can be sintered at a temperature about 200° C. lower than can a conventional sinterable aluminum nitride composition.

EXAMPLE 5

Each of the sintering aids indicated in Table 4 was added to the same aluminum nitride as used in Example 1, and they were uniformly mixed in ethanol. The mixture was dried, and then about 1.0 g of the mixture was monoaxially pressed under a pressure of 200 kg/cm² in a mold having an inside diameter of 15 mm, and then rubber-pressed under a pressure of 1500 kg/cm² to produce a raw molded article having a density of 1.60 g/cm³. The raw molded article was placed in a graphite crucible coated with boronnitride powder. Temperature was elevated to 1100° C. in nitrogen under 1 atmosphere over 40 minutes, and then the temperature was elevated from 1100° to 1800° C. at a rate of 15° C./min. The molded article was then maintained at 1800° C. for 6 hours to produce a sintered body. The thermal conductivity of the sintered body was measured by the laser flash method using an In-Sb infrared ray sensor on a 3 mm thick sample. Its transmittance was also measured. The oxygen content of the sintered body was measured by radioactivation analysis. The results are shown in Table 4. Run No. 5 is a comparative example in which CaF₂ was not used.

EXAMPLE 6

CaO and CaF₂ in the amounts indicated in Table 5 were mixed with the same aluminum nitride as used in Example 5, and the mixture was sintered under atmospheric pressure at varying rates of temperature elevation by the same operation as in Example 5. The thermal conductivity of the sintered body was measured by using a 3 mm-thick sample, and its light transmittance was also measured. The results are shown in Table 5.

TABLE 5

| | Calcination conditions | | | Amount of the sintering aid added (wt. %) | | Amounts remaining in the sintered body (ppm) | | Oxygen content (wt. %) | Density of the sintered body (g/cm³) | Thermal conductivity (W/m · K) | Light transmittance (%) |
|---|---|---|---|---|---|---|---|---|---|---|---|
| Run No. | Temperature (°C.) | Time (hrs) | Temperature elevating rate (°C./min) | CaO | CaF₂ | Ca | (*) Other metals | | | | |
| 1 | 1800 | 4 | 10 | 1 | 2 | 210 | 180 | 0.13 | 3.26 | 179 | 27 |
| 2 | 1800 | 4 | 15 | 1 | 2 | 240 | 196 | 0.09 | 3.25 | 185 | 29 |
| 3 | 1800 | 4 | 25 | 1 | 2 | 230 | 191 | 0.10 | 3.26 | 179 | 25 |

(*) The total amount of Mg, Cr, Si, Zn, Fe, Cu, Mn, Ni, Ti and Co as metal

EXAMPLE 7

Each of the sintering aids indicated in Table 6 were mixed with the same aluminum nitride as used in Example 5, and the mixture was sintered under atmospheric pressure at varying rates of temperature elevation by the same operation as in Example 5. The thermal conductivity of the sintered body was measured by using a 3 mm-thick sample, and its light transmittance was also measured. The results are shown in Table 6.

TABLE 6

| | Calcination conditions | | | Amount of the sintering aid added (wt. %) | | Amounts remaining in the sintered body (ppm) | | | Oxygen content (wt. %) | Density of the sintered body (g/cm³) | Thermal conductivity (W/m · K) | Light transmittance (%) |
|---|---|---|---|---|---|---|---|---|---|---|---|---|
| Run No. | Temperature (°C.) | Time (hrs) | Temperature elevating rate (°C./min) | Halogen-free compound | Halogen-compound | Metal derived from the halogen-free compound | Metal derived from the halogen compound | (*) Other metals | | | | |
| 1 | 1800 | 4 | 15 | CaO 5 | BaBr₂ 2 | Ca 410 | Ba 420 | 230 | 0.14 | 3.25 | 175 (219**) | 27 |
| 2 | 1800 | 4 | 15 | BaO 1 | SrI₂ 2 | Ba 180 | Sr 390 | 217 | 0.12 | 3.25 | 173 | 19 |
| 3 | 1800 | 4 | 15 | SrO 1 | CaBr₂ 3 | Sr 210 | Ca 280 | 225 | 0.20 | 3.26 | 167 | 20 |

(*) The total amount of Mg, Cr, Si, Zn, Fe, Cu, Mn, Ni, Ti and Co as metal
(**) Measured by using a 6 mm-thick sample

EXAMPLE 8

CaO powder (1.0% by weight) and 2.0% by weight of YF₃ powder were added to aluminum nitride powder having an average particle diameter of 1.42 micrometers, containing 97% by weight of particles having particles with an average particle diameter of not more

TABLE 4

| | Calcination conditions | | | Amount of the sintering aid added (wt. %) | | Amounts remaining in the sintered body (ppm) | | Oxygen content (wt. %) | Density of the sintered body (g/cm³) | Thermal conductivity (W/m · K) | Light trans. mittance (%) |
|---|---|---|---|---|---|---|---|---|---|---|---|
| Run No. | Temperature (°C.) | Time (hrs) | Temperature elevating rate (°C./min) | Halogen-free compound | CaF₂ | Ca | (*) Other metals | | | | |
| 1 | 1800 | 6 | 15 | CaO | 1 | 2 | 310 | 191 | 0.10 | 3.26 | 180 | 37 |
| 2 | 1800 | 6 | 15 | Ca(NO₃)₂ | 1 | 2 | 260 | 182 | 0.12 | 3.26 | 183 | 39 |
| 3 | 1800 | 6 | 15 | CaCo₃ | 1 | 2 | 340 | 194 | 0.15 | 3.25 | 179 (229**) | 31 |
| 4 | 1800 | 6 | 15 | Ca(COO)₂ | 1 | 2 | 290 | 188 | 0.14 | 3.25 | 177 | 33 |
| 5 | 1800 | 6 | 15 | CaO | 1 | 0 | 410 | 310 | 0.58 | 3.26 | 134 | 29 |

(*) The total amount of Mg, Cr, Si, Zn, Fe, Cu, Mn, Ni, Ti and Co as metal
(**) Measured by using a 6 mm-thick sample than 3 micrometers, and having the composition shown in Table 7, and they were uniformly mixed in ethanol. The mixture was dried, and about 1.0 g of the mixture was monoaxially pressed under a pressure of 200 kg/cm² in a mold having an inside diameter of 15 mm, and then rubber-pressed under a pressure of 1500 kg/cm² to produce a raw molded article having a density of 1.62 g/cm³. The raw molded article was placed in a graphite crucible coated with boron nitride powder. Temperature was raised to 1100° C. in nitrogen under 1 atmosphere over the course of 40 minutes, and then the temperature was raised from 1100° to 1800° C. at a rate of 10° C./min. The molded article was maintained at 1800° C. for 10 hours. The resulting sintered body had a density of 3.25 g/cm³. The sintered body was machined to a thicknesss of 3 mm and its thermal conductivity was measured by means of an In-Sb infrared ray sensor without contact in accordance with the laser flash method. It had a thermal conductivity of 230 W/m.K at room temperature, 205 W/m.K at 100° C., and 180 W/m.K at 200° C. When a 6-mm thick sample was used, it showed a thermal conductivity of 267 W/m.K.

The oxygen content of this sintered body, measured by a radioactivation analysis method, was 0.08% by weight.

The sintered body was melted in alkali, and the contents of Ca, Y, Mg, Cr, Si, Zn, Fe, Cu, Mn, Ni, Ti and Co were measured by inductively coupled plasma emission spectral analysis. They were Ca=510 ppm, Y=590 ppm, Mg<5 ppm, Cr<10 ppm, Si=97 ppm, Zn<10 ppm, Fe<10 ppm, Cu<10 ppm, Mn<5 ppm, Ni=19 ppm, Ti<10 ppm, and Co<10 ppm as concentrations based on the sintered body. The total content of ten elements excepting Ca and Y added as the sintering aid was less than 186 ppm.

Another sintered body obtained by sintering in the same manner as above was machined to a thickness of 0.5 mm and both surfaces of it were mirror-surface polished. When its light transmittance was measured, a linear transmittance of 34% was obtained with respect to a wavelength of 6.0 micrometers.

TABLE 7

| Analysis of aluminum nitride powder | |
|---|---|
| AlN content | 98.0% |
| Element | Content |
| Mg | < 5 (ppm) |
| Cr | <10 (ppm) |
| Si | 27 (ppm) |
| Zn | <10 (ppm) |
| Fe | 13 (ppm) |
| Cu | <5 (ppm) |
| Mn | <5 (ppm) |
| Ni | <10 (ppm) |
| Ti | <5 (ppm) |
| Co | <5 (ppm) |
| Al | 64.8 (wt. %) |
| N | 33.5 (wt. %) |
| O | 1.0 (wt. %) |
| C | 0.05 (wt. %) |

EXAMPLE 9

$YF_3$ and each of the halogen-free compounds indicated in Table 8 were mixed with the aluminum nitride powder as used in Example 8, and the mixture was sintered under atmospheric pressure by the same method as in Example 8. The results are shown in Table 8.

Thermal conductivity was measured by using a 3 mm thick sample. The light transmittance of the sintered body was also measured.

Runs Nos. 9 and 10 are comparative examples in which either one of the sintering aid components was not used.

TABLE 8

| | Calcination conditions | | | Amount of the sintering aid added (wt. %) | | Amounts remaining in the sintered body (ppm) | | | Oxygen content (wt. %) | Density of the sintered body (g/cm³) | Thermal conductivity (W/m · K) | Light transmittance (%) |
|---|---|---|---|---|---|---|---|---|---|---|---|---|
| Run No. | Temperature (°C.) | Time (hrs) | Temperature elevating rate (°C./min) | Halogen-free compound | $YF_3$ | Metal derived from the halogen-free compound | Yttrium | (*) Other metals | | | | |
| 1 | 1800 | 4 | 15 | $Y_2O_3$ | 1 | 2 | Y 2300 | — | 223 | 0.18 | 3.26 | 171 | 19 |
| 2 | 1800 | 4 | 15 | $Y(NO_3)_3$ | 2 | 2 | Y 1050 | — | 205 | 0.24 | 3.25 | 169 (220**) | 25 |
| 3 | 1800 | 4 | 15 | $La_2O_3$ | 1 | 2 | La 780 | 2050 | 231 | 0.17 | 3.25 | 174 | 17 |
| 4 | 1800 | 4 | 15 | $Sm_2O_3$ | 1 | 2 | Sm 470 | 1930 | 193 | 0.21 | 3.26 | 170 | 11 |
| 5 | 1800 | 4 | 15 | $CeO_2$ | 1 | 2 | Ce 580 | 2100 | 242 | 0.22 | 3.24 | 164 | 12 |
| 6 | 1800 | 4 | 15 | $Ca(NO_3)_2$ | 1 | 2 | Ca 310 | 890 | 190 | 0.14 | 3.25 | 185 | 18 |
| 7 | 1800 | 4 | 15 | $CaCO_3$ | 1 | 2 | Ca 340 | 910 | 185 | 0.11 | 3.26 | 190 | 23 |
| 8 | 1800 | 4 | 15 | $Ca(COO)_2$ | 2 | 2 | Ca 390 | 790 | 213 | 0.15 | 3.25 | 187 | 20 |
| 9 | 1800 | 4 | 15 | CaO | 1 | 0 | Ca 220 | — | 195 | 0.53 | 3.25 | 131 | 22 |
| 10 | 1800 | 4 | 15 | | 0 | 1 | — | 5200 | 237 | 0.64 | 3.27 | 129 | 15 |

(*) The total amount of Mg, Cr, Si, Zn, Fe, Cu, Mn, Ni, Ti and Co as metal
(**) Measured by using a 6 mm-thick sample

EXAMPLE 10

CaO and $YF_3$ were mixed with the same aluminum nitride powder as used in Example 8, and the mixture was sintered under atmospheric pressure by the same operation as in Example 8 at varying rates of temperature elevation. Thermal conductivity was measured by using a 3 mm thick sample. The light transmittance of the sintered body was measured. The results are shown in Table 9.

TABLE 9

| Run No. | Calcination conditions | | | Amount of the sintering aid added (wt. %) | | Amounts remaining in the sintered body (ppm) | | | Oxygen content (wt. %) | Density of the sintered body (g/cm³) | Thermal conductivity (W/m · K) | Light transmittance (%) |
|---|---|---|---|---|---|---|---|---|---|---|---|---|
| | Temperature (°C.) | Time (hrs) | Temperature elevating rate (°C./min) | CaO | YF₃ | Ca | Y | (°) Other metals | | | | |
| 1 | 1800 | 4 | 10 | 3 | 5 | 620 | 830 | 189 | 0.15 | 3.26 | 182 | 27 |
| 2 | 1800 | 4 | 15 | 1 | 2 | 490 | 720 | 205 | 0.13 | 3.25 | 198 | 25 |
| 3 | 1800 | 4 | 25 | 1 | 2 | 530 | 690 | 193 | 0.11 | 3.25 | 196 | 24 |

(°) The total amount of Mg, Cr, Si, Zn, Fe, Cu, Mn, Ni, Ti and Co as metal

EXAMPLE 11

Each of the sintering aids indicated in Table 10 was mixed with the same aluminum nitride powder as used in Example 8, and the mixture was sintered under atmospheric pressure by the same opearation as in Example 8. Thermal conductivity was measured by using a 3 mm-thick sample. The light transmittance of the sintered product was also measured. The results are shown in Table 10.

1800° C. for 10 hours. The resulting sintered body had a density of 3.26 g/cm³. The thermal conductivity of the sintered body, measured by using a 3 mm-thick sample, was 215 W/m.K. When a 6 mm-thick sample was used, it showed a thermal conductivity of 261 W/m.K.

The oxygen content of this sintered body, measured by radioactivation analysis, was 0.08% by weight.

The sintered body was treated by an alkali fusion method, and the contents of Ca, Y, Mg, Cr, Si, Zn, Fe,

TABLE 10

| Run No. | Calcination conditions | | | Amount of the sintering aid added (wt. %) | | Amounts remaining in the sintered body (ppm) | | | Oxygen content (wt. %) | Density of the sintered body (g/cm³) | Thermal conductivity (W/m · K) | Light transmittance (%) |
|---|---|---|---|---|---|---|---|---|---|---|---|---|
| | Temperature (°C.) | Time (hrs) | Temperature elevating rate (°C./min) | Halogen-free compound | Halogen-compound | Metal derived from the halogen-free compound | Metal derived from the halogen compound | (°) Other metals | | | | |
| 1 | 1800 | 4 | 15 | CaO 3 | LaF₃ 3 | Ca 670 | La 930 | 251 | 0.21 | 3.26 | 168 | 17 |
| 2 | 1800 | 4 | 15 | BaO 1 | CeF₃ 3 | Ba 740 | Ce 1020 | 236 | 0.17 | 3.25 | 172 (222**) | 15 |
| 3 | 1800 | 4 | 15 | SrO 1 | SmI₃ 2 | Sr 580 | Sm 720 | 304 | 0.18 | 3.26 | 170 | 21 |
| 4 | 1800 | 4 | 15 | Y₂O₃ 3 | LaBr₃ 2 | Y 760 | La 910 | 293 | 0.17 | 3.26 | 175 | 12 |

(°) The total amount of Mg, Cr, Si, Zn, Fe, Cu, Mn, Ni, Ti and Co as metal
(°°) Measured by using a 6 mm-thick sample

REFERENTIAL EXAMPLE 1

Calcium carbonate (600 g) having an average particle diameter of 2.1 micrometers and 200 g of alumina having an average particle diameter of 0.6 micrometer were dry-mixed for 18 hours using an alumina pot and alumina balls. The mixture was calcined at 1350° C. for 4 hours. The reaction product was pulverized by an alumina pot and alumina balls. The calcination and pulverization were repeated three times until the reaction was completed. The final reaction product was pulverized by a jet mill lined with alumina to give a powder having an average particle diameter of 1.4 micrometers. This powder was 3CaO.Al₂O₃ showing a single phase by X-ray analysis.

EXAMPLE 12

One percent by weight of 3CaO.Al₂O₃ prepared in Referential Example 1 and 2% by weight of YF₃ were added to the same aluminum nitride powder as used in Example 1, and they were uniformly mixed in ethanol. The mixture was dried, and about 1.0 g of the dry mixture was monoaxially pressed under a pressure of 200 kg/cm² in a mold having an inside diameter of 15 mm, and then rubber-pressed under a pressure of 1500 kg/cm² to give a raw molded article having a density of 1.60 g/cm³. The molded article was placed in a graphite crucible coated with boron nitride. Temperature was elevated to 1100° C. in nitrogen under 1 atmosphere over the course of 40 minutes, and then the temperature was raised from 1100° C. to 1800° C. at a rate of 15° C./min. The molded article was then mainained at Cu, Mn, Ni, Ti and Co were measured by inductively coupled plasma emission spectral analysis. They were Ca=210 ppm, Y=300 ppm, Mg<5 ppm, Cr<10 ppm, Si=93 ppm, Zn<10 ppm, Fe<10 ppm, Cu<10 ppm, Mn<5 ppm, Ni=17 ppm, Ti=15 ppm, and Co<10 ppm as concentrations based on the sintered body. The total content of ten elements other than Ca and Y added as the sintering aid was less than 185 ppm.

Another sintered body obtained by sintering in the same manner as above was machined to a thickness of 0.5 mm and both surfaces of it were mirror-surface polished. When its light transmittance was measured, a linear transmittance of 35% was obtained with respect to a wavelength of 6.0 micrometers.

For comparison, a sintered body was produced by the above procedure except that 1% by weight of only 3CaO.Al₂O₃ was added to the same aluminum nitride powder as above. The resulting sintered body had a density of 3.25 g/cm³, and a thermal conductivity, measured on a 3 mm-thick sample, of 105 W/m.K.

REFERENTIAL EXAMPLE 2

Barium carbonate (600 g) having an average particle diameter of 1.8 micrometers and 100 g of alumina having an average particle diameter of 0.6 micrometer were dry-mixed for 18 hours using an alumina pot and alumina balls. The mixture was calcined at 1550° C. for 5 hours. The reaction product was pulverized by an alumina pot and alumina balls. The calcination and pulverization were repeated three times until the reaction was completed. The final reaction product was pulverized by a jet mill lined with alumina to give a powder having an average particle diameter of 1.6 micrometers. This powder was $3BaO \cdot Al_2O_3$ showing a single phase by X-ray analysis.

REFERENTIAL EXAMPLE 3

Strontium carbonate (550 g) having an average particle diameter of 3.2 micrometers and 100 g of alumina having an average particle diameter of 0.6 micrometer were dry-mixed for 18 hours using an alumina pot and alumina balls. The mixture was calcined at 1600° C. for 4 hours. The reaction product was pulverized by an alumina pot and alumina balls. The calcination and pulverization were repeated three times until the reaction was completed. The final reaction product was pulverized by a jet mill lined with alumina to give a powder having an average particle diameter of 1.4 micrometers. This powder was $3SrO \cdot Al_2O_3$ showing a single phase by X-ray analysis.

EXAMPLE 13

$YF_3$ (2% by weight) and 1% by weight of each of the calcium aluminates prepared as in Referential Example 1, barium aluminate prepared in Referential Example 2, or strontium aluminate prepared in Referential Example 3 were mixed with the same aluminum nitride powder as used in Example 12, and the mixture was calcined as in Example 12 to produce a pressureless sintered body.

The results are shown in Table 11. Thermal conductivity was measured by using a 3 mm-thick sample. The light transmittance of the sintered body was also measured.

TABLE 11

| | Calcination conditions | | | Amount of the sintering aid added (wt. %) | | Amounts remaining in the sintered body (ppm) | | | | Density of the sintered body (g/cm³) | Thermal conductivity (W/m · K) | Light transmittance (%) |
|---|---|---|---|---|---|---|---|---|---|---|---|---|
| Run No. | Temperature (°C.) | Time (hrs) | Temperature elevating rate (°C./min) | Halogen-free compound | $YF_3$ | Metal derived from the halogen-free compound | Yttrium | (*) Other metals | Oxygen content (wt. %) | | | |
| 1 | 1800 | 6 | 15 | $5CaO \cdot 3Al_2O_3$ | 1 | 2 | Ca 215 | 603 | 193 | 0.09 | 3.25 | 205 (256**) | 30 |
| 2 | 1800 | 6 | 15 | $12CaO \cdot 7Al_2O_3$ | 1 | 2 | Ca 193 | 570 | 216 | 0.13 | 3.26 | 193 | 32 |
| 3 | 1800 | 6 | 15 | $CaO \cdot Al_2O_3$ | 1 | 2 | Ca 267 | 598 | 184 | 0.12 | 3.24 | 182 | 28 |
| 4 | 1800 | 6 | 15 | $CaO \cdot 2Al_2O_3$ | 1 | 2 | Ca 240 | 490 | 203 | 0.12 | 3.25 | 190 | 21 |
| 5 | 1800 | 6 | 15 | $3BaO \cdot Al_2O_3$ | 1 | 2 | Ba 378 | 620 | 214 | 0.10 | 3.26 | 185 | 25 |
| 6 | 1800 | 6 | 15 | $3SrO \cdot Al_3O_3$ | 1 | 2 | Sr 407 | 521 | 195 | 0.15 | 3.25 | 183 | 19 |

(*) The total amount of Mg, Cr, Si, Zn, Fe, Cu, Mn, Ni, Ti and Co as metal
(**) Measured by using a 6 mm-thick sample

EXAMPLE 14

Each of the alkaline earth metal aluminates and each of the halogen compounds indicated in Table 12 were mixed as the sintering aid with the same aluminum nitride powder as used in Example 12. The mixture was calcined in the same way as in Example 12 to give a pressureless sintered body. Thermal conductivity was measured by using a 3 mm-thick sample, and the light transmittance of the sintered body was also measured. The results are shown in Table 12.

TABLE 12

| | Calcination conditions | | | Amount of the sintering aid added (wt. %) | | Amounts remaining in the sintered body (ppm) | | | | Density of the sintered body (g/cm³) | Thermal conductivity (W/m · K) | Light transmittance (%) |
|---|---|---|---|---|---|---|---|---|---|---|---|---|
| Run No. | Temperature (°C.) | Time (hrs) | Temperature elevating rate (°C./min) | Halogen-free compound | Halogen-compound | Metal derived from the halogen-free compound | Metal derived from the halogen compound | (*) Other metals | Oxygen content (wt. %) | | | |
| 1 | 1800 | 4 | 15 | $3CaO \cdot Al_2O_3$ 1 | $CeF_3$ 2 | Ca 98 | Ce 250 | 287 | 0.17 | 3.25 | 178 | 27 |
| 2 | 1800 | 4 | 15 | $3BaO \cdot Al_2O_3$ 1 | $LaBr_3$ 1 | Ba 458 | La 310 | 193 | 0.19 | 3.26 | 168 | 20 |
| 3 | 1800 | 4 | 15 | $12CaO \cdot 7Al_2O_3$ 1 | $CaF_2$ 5 | Ca 280 | | 264 | 0.13 | 3.26 | 180 | 29 |
| 4 | 1800 | 4 | 15 | $3SrO \cdot Al_2O_3$ 2 | $SmI_3$ 2 | Sr 210 | Sm 405 | 251 | 0.12 | 3.26 | 175 (219**) | 17 |
| 5 | 1800 | 4 | 15 | $3CaO \cdot Al_2O_3$ 1 | $BaBr_2$ 2 | Ca 220 | Ba 453 | 190 | 0.16 | 3.25 | 170 | 12 |
| 6 | 1800 | 4 | 15 | $3CaO \cdot Al_2O_3$ 1 | $SrI_2$ 2 | Ca 218 | Sr 370 | 323 | 0.18 | 3.26 | 174 | 20 |

(*) The total amount of Mg, Cr, Si, Zn, Fe, Cu, Mn, Ni, Ti and Co as metal
(**) Measured by using a 6 mm-thick sample

EXAMPLE 15

$YF_3$ and $3CaO \cdot Al_2O_3$ were mixed with the same aluminium nitride powder as used in Example 12, and the mixture was calcined by the same method as in Example 12 at varying rates of temperature elevation to give a pressureless sintered body. The thermal conductivity of the sintered body was measured by using a 3 mm-thick sample, and its light transmittance was also measured. The results are shown in Table 13.

TABLE 13

| Run No. | Calcination conditions | | | Amount of the sintering aid added (wt. %) | | Amounts remaining in the sintered body (ppm) | | | Oxygen content (wt. %) | Density of the sintered body g/cm³ | Thermal conductivity W/m · K | Light transmittance (%) |
|---|---|---|---|---|---|---|---|---|---|---|---|---|
| | Temperature (°C.) | Time (hrs) | Temperature elevating rate (°C./min) | 3CaO · Al₂O₃ | YF₃ | Ca | Y | (°) Other metals | | | | |
| 1 | 1800 | 4 | 10 | 1 | 2 | 230 | 725 | 343 | 0.13 | 3.25 | 183 | 31 |
| 2 | 1800 | 4 | 15 | 1 | 2 | 255 | 770 | 293 | 0.15 | 3.25 | 179 | 29 |
| 3 | 1800 | 4 | 25 | 1 | 2 | 243 | 698 | 298 | 0.15 | 3.26 | 181 | 33 |

(°) The total amount of Mg, Cr, Si, Zn, Fe, Cu, Mn, Ni, Ti and Co as metal

EXAMPLE 16

$Y_2O_3$ powder (1.0% by weight) and 1.0% by weight of $CaF_2$ powder were added as a sintering aid to the same aluminum nitride powder as used in Example 1, and they were uniformly mixed in ethanol. The mixture was dried, and about 2.0 g of the mixture was monoaxially pressed under a pressure of 200 kg/cm² in a mold having an inside diameter of 15 mm, and then rubber-pressed under a pressure of 1500 kg/cm² to produce a raw molded article having a density of 1.60 g/cm³. The raw molded article was further placed in a graphite crucible coated with boron nitride powder. Temperature was raised to 1100° C. in nitrogen under 1 atmosphere over the course of 40 minutes, and then the temperature was raised from 1100° to 1800° C. at a rate of 10° C./min. The molded article was maintained at 1800° C. for 15 hours. The resulting sintered body had a density of 3.26 g/cm³, and an oxygen content, measured by radioactivation analysis, of 0.06% by weight. The sintered body had a thermal conductivity of 261 W/m.K at room temperature, 220 W/m.K at 100° C., and 180 W/m.K at 200° C. when it was measured by using a 6 mm-thick sample. When a sample having a thicknesss of 3 mm was used, its thermal conductivity was 191 W/m.K.

The sintered body was treated by alkali fusion method, and the contents of Ca, Y, Mg, Cr, Si, Zn, Fe, Cu, Mn, Ni, Ti and Co were measured by inductively coupled plasma emission spectral analysis. They were Ca=8 ppm, Y=250 ppm, Mg<5 ppm, Cr<10 ppm, Si=71 ppm, Zn<10 ppm, Fe<10 ppm, Cu<10 ppm, Mn<5 ppm, Ni=5 ppm, Ti<10 ppm, and Co<10 ppm as concentrations based on the sintered body.

Another sintered body obtained by sintering in the same manner as bove was machined to a thickness of 0.5 mm and both surfaces of it were mirror-surface polished. When its light transmittance was measured, a linear transmittance of 37% was obtained with respect to a wavelength of 6.0 micrometers.

The electrical properties of another sintered body produced as above were measured at room temperature. The results wer as follows:

Volume resistivity: $2 \times 10^{14}$ ohms-cm
Dielectric constant (1 MHz): 8.9
Dielectric tangent (1MHz): $4 \times 10^{-4}$
Dielectric breakdown strength: 17 KV/mm

EXAMPLE 17

Example 16 was repeated except that the sintering aids shown in Table 14 were used. The properties of the sintered bodies were measured as in Example 16, and the results are shown in Table 14.

TABLE 14

| Run No. | Amount of the sintering aid added (wt. %) | | | | Calcination conditions | | Amounts remaining in the sintered body (ppm) | | Oxygen content (wt. %) | Properties of the sintered body | | |
|---|---|---|---|---|---|---|---|---|---|---|---|---|
| | Halogen-free compound | | Halogen-compound | | Temperature (°C.) | Time (hrs) | Metal derived from the halogen-free compound | Metal derived from the halogen compound | | Density (g/cm³) | Thermal conductivity (W/m · K) | Light transmittance (%) |
| 1 | La₂O₃ | 1% | CaF₂ | 2% | 1800 | 18 | 830 | 11 | 0.07 | 3.25 | 243 | 24 |
| 2 | CaO | 2% | YF₃ | 1% | 1800 | 18 | 25 | 270 | 0.05 | 3.25 | 256 | 30 |
| 3 | BaO | 2% | LaF₃ | 2% | 1800 | 18 | 40 | 860 | 0.09 | 3.25 | 235 | 27 |
| 4 | 3CaO · Al₂O₃ | 2% | YF₃ | 1% | 1800 | 15 | 40 | 320 | 0.09 | 3.26 | 240 | 36 |
| 5 | 3BaO · Al₂O₃ | 2% | LaF₃ | 1% | 1800 | 18 | 70 | 740 | 0.08 | 3.26 | 225 | 21 |
| 6 | Y₂O₃ | 1% | YF₃ | 1% | 1800 | 15 | 920 | | 0.08 | 3.25 | 228 | 22 |
| 7 | CaO | 1% | CaF₂ | 1% | 1800 | 15 | 110 | | 0.09 | 3.26 | 217 | 35 |
| 8 | 3CaO · Al₂O₃ | 1% | BaF₂ | 1% | 1800 | 15 | 70 | 60 | 0.10 | 3.25 | 218 | 38 |

What is claimed is:

1. A sintered body of aluminum nitride, said sintered body having a thermal conductivity of at least 200 W/m°K measured at room temperature on a sintered body having a thickness of 6 mm and a high density of at least 3.2 g/cm³ and consisting essentially of at least 99% by weight of aluminum nitride, at most 0.2% by weight of bound oxygen, at most 0.1% by weight as metal of an oxide of at least one metal element selected from the group consisting of alkaline earth metals, lanthanum group metals and yttrium and at most 0.1% by weight as metal of metal compounds as impurities, wherein the alkaline earth metals are calcium, strontium and barium, and the metal of the metal compounds is silicon, iron, chromium, nickel, cobalt, copper or titanium and said sintered body having a light translucency represented by a coefficient of absorption, determined from its linear transmittance to light having a wavelength of 6 micrometers, of not more than 45 cm$^{-1}$.

2. A sintered body of aluminum nitride, said sintered body having a thermal conductivity of at least 220 W/m°K measured at room temperature on a sintered body having a thickness of 6 mm and a high density of at least 3.2 g/cm$^3$ and comprising at least 99% by weight of aluminum nitride, at most 0.2% by weight of bound oxygen, at most 0.1% by weight as metal of an oxide of at least one metal element selected from the group consisting of alkaline earth metals, lanthanum group metals and yttrium and at most 0.1% by weight as metal of metal compounds as impurities, wherein the alkaline earth metals are calcium, strontium and barium, and the metal of the metal compounds is silicon, iron, chromium, nickel, cobalt, copper or titanium and said sintered body having a light translucency represented by a coefficient of absorption, determined from its linear transmittance to light having a wavelength of 6 micrometers, of not more than 45 cm$^{-1}$.

3. A process for producing a sintered body of aluminum nitride of claim 1 or 2 which comprises:
  (1) forming a raw molded article from a homogeneous mixture of
    (A) a fine powder of aluminum nitride, and
    (B) a sintering aid composed substantially of (a) at least one halogen compound of at least one metal selected from the group consisting of alkaline earth metals, lanthanum group metals and yttrium, and (b) at least one halogen-free compound of at least one metal selected from the group consisting of alkaline earth metals, lanthanum group metals and yttrium, wherein said alkaline earth metals are calcium, strontium and barium; and
  (2) sintering the raw molded article at a temperature of 1600° to 2100° C. in a non-oxidizing atmosphere, to form said sintered body.

4. The process of claim 3 wherein the sintering is carried out at a temperature of 1650° to 1900° C.

5. The process of claim 3 wherein the temperature is elevated at a rate of 1° to 40° C./min. at least from 1300° to 1600° C. until it reaches 1600° C. at which the sintering is carried out.

6. The process of claim 3 wherein the homogeneous mixture is composed of at least 85% by weight of the fine powder of aluminum nitride, 0.02 to 10% by weight of the halogen compound and 0.02 to 5% by weight of the halogen-free compound.

7. The process of claim 3 wherein the halogen compound is a halogen compound of an alkaline earth metal, and the halogen-free compound is at least one halogen-free compound of at least one metal selected from the group consisting of lanthanum group metals and yttrium.

8. The process of claim 3 wherein the halogen compound is at least one halogen compound of at least one metal selected from the group consisting of lanthanum group metals and yttrium, and the halogen-free compound is a halogen-free compound of an alkaline earth metal.

9. The process of claim 8 wherein the halogen-free compound of an alkaline earth metal is an alkaline earth metal aluminate.

10. The sintered body produced by the process of claim 3, said sintered body having a light translucency represented by a coefficient of absorption, determined from its linear transmittance to light having a wavelength of 6 micrometers, of not more than 45 cm$^{-1}$.

* * * * *